(12) United States Patent
Thrasher et al.

(10) Patent No.: US 11,734,422 B2
(45) Date of Patent: *Aug. 22, 2023

(54) CORE SHELL LIQUID METAL ENCAPSULATES COMPRISING MULTI-FUNCTIONAL LIGANDS AND NETWORKS COMPRISING SAME

(71) Applicant: Government of the United States, as represented by the Secretary of the Air Force, Wright-Patterson AFB, OH (US)

(72) Inventors: Carl J. Thrasher, Beavercreek, OH (US); Christopher E. Tabor, Kettering, OH (US); Zachary J. Farrell, Xenia, OH (US); Nicholas J. Morris, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/376,644

(22) Filed: Jul. 15, 2021

(65) Prior Publication Data

US 2021/0365552 A1    Nov. 25, 2021

Related U.S. Application Data

(63) Continuation of application No. 16/580,601, filed on Sep. 24, 2019, now Pat. No. 11,100,223.
(Continued)

(51) Int. Cl.
*H01B 1/22*   (2006.01)
*H01B 1/08*   (2006.01)
(Continued)

(52) U.S. Cl.
CPC .......... *G06F 21/554* (2013.01); *G06F 21/556* (2013.01); *G06F 21/755* (2017.08);
(Continued)

(58) Field of Classification Search
CPC .... B23K 35/0244; B01J 13/04; H05K 1/0283
See application file for complete search history.

(56) References Cited

U.S. PATENT DOCUMENTS

| 5,198,189 A | 3/1993 | Booth et al. |
| 7,491,892 B2 | 2/2009 | Wagner et al. |

(Continued)

FOREIGN PATENT DOCUMENTS

| JP | H11220182 A | 8/1999 |
| KR | 101687371 B1 | 12/2016 |

(Continued)

OTHER PUBLICATIONS

Machine Translation of JPH11220182A, Yasunori et al. Publication Date Aug. 10, 1999.
(Continued)

*Primary Examiner* — Khanh T Nguyen
(74) *Attorney, Agent, or Firm* — AFMCLO/JAZ; James F. McBride (57) ABSTRACT

The present invention relates to core shell liquid metal encapsulates comprising multi-functional ligands, networks comprising such encapsulates and processes of making and using such encapsulates and networks. When subjected to strain, such network's conductivity is enhanced, thus allowing the network to serve as a healing agent that restores at least a portion of the conductivity in an adjacent conductor.

18 Claims, 1 Drawing Sheet

Related U.S. Application Data (60) Provisional application No. 62/754,624, filed on Nov. 2, 2018.

(51) Int. Cl.
  *G06F 21/55* (2013.01)
  *G06F 21/75* (2013.01)

(52) U.S. Cl.
  CPC ............... *H01B 1/08* (2013.01); *H01B 1/22* (2013.01); *G06F 2221/034* (2013.01)

(56) References Cited

U.S. PATENT DOCUMENTS

| | | |
|---|---|---|
| 9,859,226 B1 | 1/2018 | Campbell et al. |
| 9,930,773 B2 | 3/2018 | Holbery et al. |
| 2003/0215394 A1 | 11/2003 | Short et al. |
| 2005/0284232 A1 | 12/2005 | Rice |
| 2008/0277631 A1 | 11/2008 | Smela et al. |
| 2013/0244037 A1 | 9/2013 | Hohman et al. |
| 2014/0147959 A1 | 5/2014 | Ratcurt et al. |
| 2016/0049227 A1 | 2/2016 | Bottiglio et al. |
| 2016/0218287 A1 | 7/2016 | McAlpine et al. |
| 2016/0317992 A1 | 11/2016 | Thuo et al. |
| 2017/0089774 A1 | 3/2017 | Rykaczewski et al. |
| 2017/0218167 A1 | 8/2017 | Majidi et al. |
| 2017/0235021 A1 | 8/2017 | Boley et al. |
| 2018/0029290 A1 | 2/2018 | Bottiglio et al. |

FOREIGN PATENT DOCUMENTS

| | | |
|---|---|---|
| WO | WO2013044226 A2 | 3/2013 |
| WO | WO2015073944 A2 | 5/2015 |
| WO | WO2017072347 A1 | 5/2017 |
| WO | WO2017151523 A1 | 9/2017 |

OTHER PUBLICATIONS

Machine Translation of KR101687371 B1, Kyoo et al. Publication Date Dec. 16, 2016.
Bartlett, Michael D.; Fassler, Andrew; Kazem, Navid; Markvicka, Eric J.; Mandal, Pratiti; Majidi, Carmel; Stretchable, High-k Dielectric Elastomers through Liquid-Metal Inclusions. Adv. Mater. 2016, 28, 3726-3731.
Wagner, Sigurd; Bauer, Siegfried; Materials for stretchable electronics. MRS Bulletin, 2012, 37, 207-213.
Xu, Feng; Zhu, Yong; Highly conductive and stretchable silver nanowire conductors. Adv. Mater. 2012, 24, 5117-5122.
Liu, Z. F.; Fang, S.; Moura, F. A.; Ding, J. N.; Jiang, N.; Di, J.; Zhang, M.; Lepro, X.; Galvao, D. S.; Haines, C. S.; Yuan, N. Y.; Yin, S. G.; Lee, D. W.; Wang, R.; Wang, H. Y.; Lv, W.; Dong, C.; Zhang, R. C.; Chen, M. J.; Yin, Q.; Chong, Y. T.; Zhang, R.; Wang, X.; Lima, M. D.; Ovalle-Robles, R.; Qian, D.; Lu, H.; Baughman, R. H.; Hierarchically buckled sheath-core fibers for superelastic electronics, sensors, and muscles. Science 2015, 349, 6246, 400-404.
Wang, Jiangxin; Cai, Guofa; Li, Shaohui; Gao, Dace; Xiong, Jiaqing; Lee, Pooi See; Printable Superelastic Conductors with Extreme Stretchability and Robust Cycling Endurance Enabled by Liquid-Metal Particles. Adv. Mater. 2018, 30, 1706157, 1-7.
Hirsch, Arthur; Michaud, Hadrien O.; Gerratt, Aaron P.; De Mulatier, Severine; Lacour, Stephanie P.; Intrinsically Stretchable Biphasic (Solid-Liquid) Thin Metal Films. Adv. Mater. 2016, 28, 4507-4512.
Trevor R. Lear, Seok-Hee Hyun, John William Boley, Edward L. White, David H. Thompson, Rebecca K. Kramera, Liquid metal particle popping: Macroscale to nanoscale. Extreme Mechanics Letters 2017, 13, 126-134.
Boley, John W.; White, Edward L.; Kramer, Rebecca K.; Mechanically Sintered Gallium-Indium Nanoparticles. Adv. Mater. 2015, 27, 2355-2360.
Yamaguchi, Akihisa; Mashima, Yu; Iyoda, Tomokazu; Reversible Size Control of Liquid-Metal Nanoparticles under Ultrasonication. Angew. Chem. Int. Ed. 2015, 54, 12809-12813.
Cooper, Matthew A.; Ostanin, Victor P.; Klenerman, David; Slepstov, Alexander; Karaimanska, Rossitza; Dultsev, Fedor N.; Stirrups, Kathleen; Kelling, Sven; Iminson, Tony; Abell, Chris; A sensitive and economical method to directly detect particles. Sensors, 2002 IEEE; DOI: 10.1109/ICSENS.2002.1037256,1042-1045.
Tang, Shi-Yang; Qiao, Ruirui; Yan, Sheng; Yuan, Dan; Zhao, Qianbin; Yun, Guolin; Davis, Thomas P.; Li, Weihua; Microfluidic Mass Production of Stabilized and Stealthy Liquid Metal Nanoparticles. Small 2018, 14, 1800118, 1-8.
Tevis, Ian D.; Newcomb, Lucas B.; Thuo, Martin; Synthesis of Liquid Core-Shell Particles and Solid Patchy Multicomponent Particles by Shearing Liquids Into Complex Particles (SLICE). Langmuir 2014, 30, 14308-14313.
Pan, Chengfeng; Kumar, Kitty; Li, Jianzhao; Markvicka, Eric J.; Herman, Peter R.; Majidi, Carmel; Visually Imperceptible Liquid-Metal Circuits for Transparent, Stretchable Electronics with Direct Laser Writing; Adv. Mater. 2018, 1706937, 1-9.
Çinar, Simge; Tevis, Ian D.; Chen, Jiahao; Thuo, Martin; Mechanical Fracturing of Core-Shell Undercooled Metal Particles for Heat-Free Soldering; Scientific Reports 2016,| 6:21864 | DOI: 10.1038/srep21864, 1-10.
Kubo, Masahiro; Li, Xiaofeng; Kim, Choongik; Hashimoto, Michinao; Wiley, Benjamin J.; Ham, Donhee; Whitesides; George M.; Stretchable Microfluidic Radiofrequency Antennas; Adv. Mater. 2010, 22, 2749-2752.
Hayes, Gerard J.; So, Ju-Hee; Qusba, Amit; Dickey, Michael D.; Lazzi, Gianluca; Flexible Liquid Metal Alloy (EGaIn) Microstrip Patch Antenna. IEEE Transactions on Antennas and Propagation. 2012, vol. 60, No. 5, 2151-2156.
So, Ju-Hee; Thelen, Jacob; Qusba, Amit; Hayes, Gerard J.; Lazzi, Gianluca; Dickey, Michael D.; Reversibly Deformable and Mechanically Tunable Fluidic Antennas. Adv. Funct. Mater. 2009, 19, 3632-3637.
Larmagnac, Alexandre; Eggenberger, Samuel; Janossy, Hanna; Voros, Janos; Stretchable electronics based on Ag-PDMS composites. Scientific Reports, 2014, 4:7254, 1-7.
Fassler, Andrew; Majidi, Carmel; Liquid-Phase Metal Inclusions for a Conductive Polymer Composite. Adv. Mater. 2015, 27, 1928-1932.
Khan, M. Rashed; Hayes, Gerard J.; Zhang, Silu; Dickey, Michael D.; Lazzi, Gianluca; A pressure responsive fluidic microstrip open stub resonator using a liquid metal alloy. IEEE Microwave Wireless Components Letters, 2012, vol. 22, No. 11, pp. 577-579.
Kubo, Masahiro; Li, Xiaofeng; Kim, Choongik; Hashimoto, Michinao; Wiley, Benjamin J.; Ham, Donhee; Whitesides, George M.; Stretchable microfluidic electric circuit applied for radio frequency antenna. Proc. IEEE APS-URSI, 2011, pp. 1582-1587.
Mazlouman, Shahrzad J.; Jiang, Xing J.; Mahanfar, Alireza N.; Menon, Carlo; Vaughan, Rodney G.; A reconfigurable patch antenna using liquid metal embedded in a silicone substrate. IEEE Trans. Antenna Propagat. Lett., 2011, vol. 59, pp. 4406-4412.
Diedhiou, Daouda L.; De Sagazan, Olivier; Sauleau, Ronan; Boriskin, Artem V.; Contactless microstrip transition for flexible microfluidic circuits and antennas. IEEE Antennas Wireless Propagat. Lett., 2015, vol. 14, pp. 1502-1505.
Agar, J.; Durden, J.; Staiculescu, D.; Zhang, R.; Gebara, E.; Wong, C.P.; Electrically conductive silicone nano-composites for stretchable RF devices. IEEE MTT-S IMS 2011.
Thrasher, C.; Zachary Farrell, Z.; Morris, N.; Willey, C.; Tabor, C.; Supporting Materials, Adv. Mater., 2019 DOI: 10.1002/adma. 201903864, 1-7.
Thrasher, C.; Zachary Farrell, Z.; Morris, N.; Willey, C.; Tabor, C.; Mechanoresponsive Polymerized Liquid Metal Networks, Adv. Mater. 2019, 1903864, 1-8.
Tabor, C.; Polymerized Liquid Metal Networks for Stretchable Electronics ACS Colloids and Interfaces Conference, Jun. 18, 2019.
Tabor, C.; Adaptive 3D-Printed Liquid Metal Electronics TMS 2019, Mar. 13, 2019.
Tabor, C.; Responsive 3D-Printed Liquid Metal Electronics, MITRE Workshop May 6, 2019.

(56) References Cited

OTHER PUBLICATIONS

Tabor, C.; Gordon Research Conference Poster, Jan. 30, 2019.

Tabor, C.; Responsive Liquid Metals for Reconfigurable, Ultra-Stretchable, and Self-Healing Electronics, IEEE Flex Electronics Meeting, Aug. 13, 2019.

Tabor, C.; Polymerized Liquid Metal Networks for Stretchable Electronics, Flex Tech 2019, Feb. 21, 2019.

Zhu, P.; Gao, S.; Lin, H.; Lu, X.; Yang, B.; Zhang, L.; Chen, Y.; Shi, J.; Inorganic Nanoshell-Stabilized Liquid Metal for Targeted Photonanomedicine in NIR-II Biowindow. Nano Lett. 2019, 19, 2128-2137.

Ren, L.; Sun, S.; Casillas-Garcia, G.; Nancarrow, M.; Peleckis, G.; Turdy, M.; Du, K.; Xu, X.; Li, W.; Jiang, L.; Dou, S. X.; Du, Y.; A Liquid-Metal-Based Magnetoactive Slurry for Stimuli-Responsive Mechanically Adaptive Electrodes. Advanced Materials. Adv. Mater. 2018, 30, 1802595.

Park, S.; Thangavel, G.; Parida, K.; Li, S.; Lee, P. S.; A Stretchable and Self-Healing Energy Storage Device Based on Mechanically and Electrically Restorative Liquid-Metal Particles and Carboxylated Polyurethane Composites. Adv. Mater. 2019, 31, 1805536.

Morris, N. J.; Farrell, Z. E.; Tabor, C. E.; Chemically modifying the mechanical properties of core-shell liquid metal nanoparticles. Nanoscale, 2019, 11, 17308-17318.

Liang, S.; Li, Y.; Chen, Y.; Yang, J.; Zhu, T.; Zhu, D.; He, C.; Liu, Y.; Handschuh-Wang, S.; Zhou, X.; Liquid metal sponges for mechanically durable, all-soft, electrical conductors. J. Mater. Chem. C, 2017, 5, 1586-1590.

Song, H.; Kim, T.; Kang, S.; Jin, H.; Lee, K.; Yoon, H. J.; Ga-Based Liquid Metal Micro/Nanoparticles: Recent Advances and Applications. Small 2019, 1903391.

Saborio, M. G.; Cai, S.; Tang, J.; Ghasemian, M. B.; Mayyas, M.; Han, J.; Michael J. Christoe, M. J.; Peng, S.; Koshy, P.; Esrafilzadeh, D.; Jalili, R.; Wang, C. H.; Kalantar-Zadeh, K.; Liquid Metal Droplet and Graphene Co-Fillers for Electrically Conductive Flexible Composites. Small 2019, 1903753.

Tutika, R.; Kmiec, S.; Haqu, A. B. M. T.; Martin, S. W.; Bartlett, M. D.; Liquid Metal-Elastomer Soft Composites with Independently Controllable and Highly Tunable Droplet Size and Volume Loading. ACS Appl. Mater. Interfaces 2019, 11, 17873-17883.

Li, X.; Li, M.; Xu, J.; You, J.; Yang, Z.; Li, C.; Evaporation-induced sintering of liquid metal droplets with biological nanofibrils for flexible conductivity and responsive actuation. Nature Communications, 2019,10:3514.

Guo, R.; Wang, H.; Sun, X.; Yao, S.; Chang, H.; Wang, H.; Liu, J.; Zhang, Y.; Semiliquid Metal Enabled Highly Conductive Wearable Electronics for Smart Fabrics. ACS Appl. Mater. Interfaces 2019, 11, 30019-30027.

Park, J. E.; Kang, H. S.; Baek, J.; Park, T.H.; Oh, S.; Lee, H.; Koo, M.; Park, C.; Rewritable, Printable Conducting Liquid Metal Hydrogel. ACS Nano 2019, 13, 9122-9130.

NPL1 U.S. Appl. No. 17/854,559.

CORE SHELL LIQUID METAL ENCAPSULATES COMPRISING MULTI-FUNCTIONAL LIGANDS AND NETWORKS COMPRISING SAME

CROSS-REFERENCE TO RELATED APPLICATION

The present application claims priority to U.S. application Ser. No. 16/580,601 filed Sep. 24, 2019, which in turn claims priority to U.S. Provisional Application Ser. No. 62/754,624 filed Nov. 2, 2018, the contents of both such applications being hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to core shell liquid metal encapsulates comprising multi-functional ligands, networks comprising such encapsulates and processes of making and using such encapsulates and networks.

BACKGROUND OF THE INVENTION

Many conductors are subject to forces, such as strain, during their use cycle. As conductors elongate under strain, they start to lose their ability to conduct current. Once the conductors break, they lose their ability to conduct current. In response to this problem, stretchable conductors, such as liquid metal embedded elastomers have been developed. Unfortunately, such liquid metal embedded elastomers can only be activated by a compressive force that is applied to rupture the matrix between particles and merge them together, they are inclined to fail under strain, they have a low volumetric conductivity, they cannot be patterned at fine resolutions and they experience unwanted activation. Thus, what is needed is a conductor that minimizes the aforementioned problems.

Applicants recognized that the source of the aforementioned problems lie in the fact that liquid metal embedded elastomers need a carrier material to contain the liquid metal. In short, such carrier material's structure and composition is subject to failure and occupies volume that could otherwise be liquid metal. Applicants discovered that replacing a physical encasement system that relies on a carrier with a chemically bound network was the solution to the aforementioned problems. Thus, Applicants disclose a networks comprising core shell liquid metal encapsulates and processes of making such networks, and methods of using such networks.

SUMMARY OF THE INVENTION

The present invention relates to core shell liquid metal encapsulates comprising multi-functional ligands, networks comprising such encapsulates and processes of making and using such encapsulates and networks. The core shell liquid metal particles are linked via ligands to form a network. When subjected to an energy input like strain, such network's conductivity is enhanced, thus allowing the network to serve as a healing agent that restores at least a portion of the conductivity in an adjacent conductor.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Figure 1A:
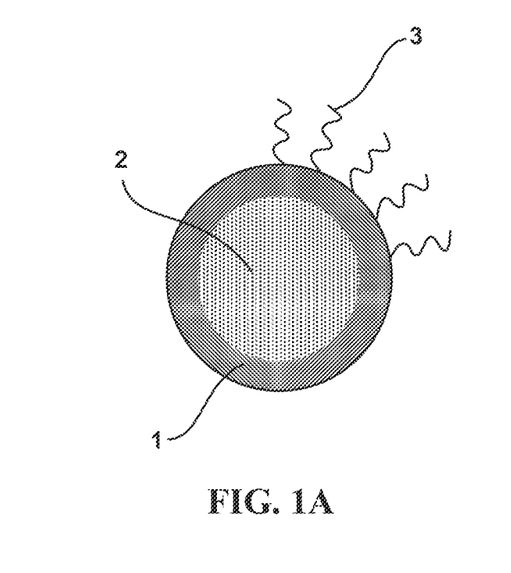
FIG. 1A is a cross-sectional view of a core shell liquid metal encapsulate comprising core 2 comprising eutectic gallium-indium alloy, multi-functional ligands 3 with head group that are covalently bound to gallium oxide comprising metal oxide shell 1.
Figure 1B:
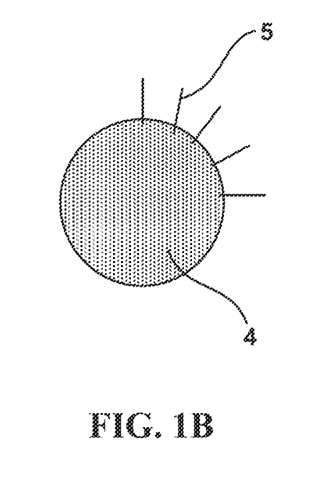
FIG. 1B is a cross-sectional view of a core shell liquid metal encapsulate, prior to shell formation, comprising multi-functional ligands 5 with head group that are coordinatively bound to the liquid metal core 4 that comprises eutectic gallium-indium alloy.
Figure 1C:
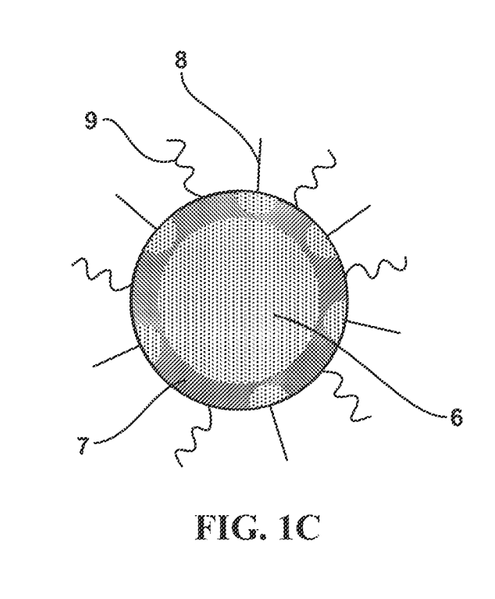
FIG. 1C is a cross-sectional view of a core shell liquid metal encapsulate comprising multi-functional ligands 9 that are covalently bound to gallium oxide comprising metal oxide shell 7 of such encapsulate and multi-functional ligands 8 that are coordinatively bound to the liquid metal core of such encapsulate via gallium eutectic gallium-indium alloy pocket in shell 7.

Unless specifically stated otherwise, as used herein, the terms "a", "an" and "the" mean "at least one".

As used herein, the terms "include", "includes" and "including" are meant to be non-limiting.

As used in this specification the terms "encapsulate" and "particle" are synonymous.

As used in this specification, the term "EGaIn" is used to denote an alloy composed of 85.8% Ga, 14.2% In on an atomic basis.

All references in this specification to ImageJ software are to ImageJ software Version 1.51n.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition weight unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every Encapsulates Comprising a Liquid Metal Core.

For purposes of this specification, headings are not considered paragraphs and thus this paragraph is Paragraph 0020 of the present specification. The individual number of each paragraph above and below this paragraph can be determined by reference to this paragraph's number. In this Paragraph 0020, Applicants disclose an encapsulate comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface:
   a) said liquid metal core comprising a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof; more preferably said liquid metal is selected from the group consisting of Ga, In, Sn, Bi, Sb and mixtures thereof; most preferably said liquid is metal selected from the group consisting of Ga, In and mixtures thereof;
   b) said shell comprising a metal oxide comprising a cation derived from a metal selected from the group consisting of Ga, In, Sn, Pb, Sb, Cd, Al, Zn, Tl, Bi, Ca, Sc, Ti, V, Cr, Sr, Y, Zr, Nb, Mo, Te, Gd, Hf, Pr, Nd, Pt, Sm, Eu, Dy, Ho, Er, Yb, Pu and mixtures thereof; preferably said metal oxide comprises a cation derived from a metal selected from the group consisting of Ga, Al, Zn, Sc, Ti, Cr, Zr, Nb, Gd, Nd, Sm and mixtures thereof; more preferably said metal oxide comprises a cation derived from a metal selected from the group consisting of Ga, Al, Zn, Gd, Nd and mixtures thereof; and
   c) said one or more multi-functional ligands comprising a head group that comprises a material selected from the group consisting of thiols, amines, phosphonic acids, alkoxysilanes, halosilanes, carboxylic acids, nitriles, and mixtures thereof; preferably said one or more multi-functional ligands comprise a head group that comprises a material selected from the group consisting of thiols, phosphonic acids, trialkoxysilanes, trichlorosilanes, and mixtures thereof; more preferably said one or more multi-functional ligands comprise a head group that comprises a material selected from the group consisting of thiols, trialkoxysilanes or phosphonic acids, and one or more additional moieties selected from the group consisting of a hydrosilane, a cyclic ester, an azide, an alcohol, an alkyne, an alkene, an isocyanate, a conjugated diene, an imine, a boronate ester, a conjugated ring, a carboxylic acid, an amine, a thiol, a phosphonic acid, an alkoxysilane, a halosilane, a nitrile and mixtures thereof; preferably said one or more additional moieties is selected from the group consisting of an unsubstituted anthracene, a substituted anthracene, an acrylate, a methacrylate, an epoxide, a ring-strained alkene, an unsubstituted alkene, a terminal alkyne, an acrylamide, a methacrylamide, a norbornene and mixtures thereof, most preferably said one or more multi-functional ligands are selected from the group consisting of 11-phosphonoundecyl acrylate, 3-(trimethoxysilyl)propyl acrylate, 3-(trimethoxysilyl) propyl methacrylate, (3-glycidyloxypropyl) triethoxysilane, 3-(triethoxysilyl)propyl isocyanate, 12-azidododecylphosphonic acid, trimethoxy[2-(7-oxabicyclo[4.1.0]hept-3-yl)ethyl]silane, 3-cyclopentadienylpropyltriethoxysilane, [(5-bicyclo[2.2.1]hept-2-enyl)ethyl]triethoxysilane, 11-phosphonoundecanoic acid, and mixtures thereof.

Applicants disclose an encapsulate according to Paragraph 0020 wherein:
   a) said liquid metal core comprising a liquid metal alloy selected from the group consisting of Ga/In, Ga/In/Sn, Ga/In/Sn/Sb, In/Sn/Bi, Bi/Pb/Sn, Bi/Pb/Sn/Cd, Bi/Pb/Sn/Cd/In and mixtures thereof; preferably said liquid metal is selected from the group consisting of Ga/In, Ga/In/Sn, Ga/In/Sn/Sb, In/Sn/Bi and mixtures thereof, most preferably said liquid is metal selected from the group consisting of 85.8 atom % Ga/14.2 atom % In, 78.3 atom % Ga/14.9 atom % In/6.8 atom % Sn and mixtures thereof;
   b) said shell comprising a metal oxide comprising a cation derived from a metal selected from the group consisting of Ga, Sn, Sb, Cd, Bi, In and mixtures thereof; preferably said metal oxide is selected from the group consisting of Ga, In, Bi and mixtures thereof, and
   c) said one or more multi-functional ligands comprise a head group that comprises a material selected from the group consisting of phosphonic acids, trialkoxysilanes, or mixtures thereof, preferably said one or more ligands comprises a head group that comprises a material are selected from the group consisting of phosphonic acids or trialkoxysilanes possessing an acrylate or methacrylate moiety and mixtures thereof, more preferably said one or more multi-functional ligands are selected from the group consisting of 11-phosphonoundecyl acrylate, 3-(trimethoxysilyl)propyl methacrylate and mixtures thereof.

Applicants disclose an encapsulate according to any of Paragraphs 0020 and 0021 wherein said encapsulate has a shell thickness of from about 0.5 nanometers to about 5 nanometers. This shell thickness is desirable when said encapsulates are used in a stretchable resistor such as a core shell liquid metal encapsulate network or when said encapsulates are used in applications that need to rupture the encapsulates via compression and/or shear forces such as a self-healing conductor or coating.

Applicants disclose an encapsulate according to any of Paragraphs 0020 through 0022 wherein said encapsulate has a principal dimension of from about 5 nanometers to about 5 millimeters. Preferably said encapsulate has a principal dimension of from about 500 nanometers to about 10 microns when said encapsulates are used in a stretchable resistor such as a core shell liquid metal encapsulate network or a principal dimension of from about 50 nanometers to about 200 nanometers when said encapsulates are used in applications that need to rupture the encapsulates via compression and/or shear forces such as a self-healing conductor or coating.

Core Shell Liquid Metal Encapsulate Network

Applicants disclose a core shell liquid metal encapsulate network comprising a plurality of encapsulates selected from the group consisting of encapsulates according to Paragraphs 0020 through 0023, and mixtures there of wherein said encapsulates' are chemically bound via a linkage comprising a residue of said ligands of said encapsulates to the external shell of an encapsulate other than the external shell of the encapsulate to which said ligands were originally covalently or coordinatively bound. In addition to the encapsulates according to Paragraphs 0020 through 0023, an encapsulate according to Paragraphs 0020 through 0023 that comprises a multi-functional ligand that comprises a thiocarbonate may be used to form a core shell liquid metal encapsulate network.

Applicants disclose a core shell liquid metal encapsulate network according to Paragraph 0024 wherein said linkage has the formula:

a) each * represents the chemical attachment point to a core shell liquid metal encapsulate;
b) each X represents a molecular segment selected from the group of chemical structures comprising C—S, C—N, C—P—O, C—Si—O, O—Si—O, C—O; preferably said molecular segment is selected from the group of chemical structures comprising thiols, amines, phosphonates, silyl ethers, esters and mixtures thereof; more preferably said molecular segment is selected from the group of chemical structures comprising phosphonates and silyl ethers and mixtures thereof;
c) R represents a molecular segment independently selected from the group of chemical structures comprising C—C, C=C, C—S—C, N—N—N, C—N, O—C—N, C—O—C, Si—O—Si; preferably said molecular segment is selected from the group of chemical structures comprising thioethers, triazoles, dimerized ring systems, urethanes, ethers, esters, amides, tetrahydropyridines, alkanes, aromatics, siloxanes and mixtures thereof; more preferably said molecular segment is selected from the group of chemical structures comprising thioethers, triazoles, urethanes, ethers, amides, carboxylic acid esters, siloxanes and mixtures thereof; most preferably said molecular segment is selected from the group of chemical structures comprising polyethers, polyacrylates, polyacrylamides, polyurethanes, polysiloxanes, thioethers, triazoles, and mixtures thereof.

Applicants disclose a core shell liquid metal encapsulate network according to any of Paragraphs 0024 and 0025, said core shell liquid metal encapsulate network comprising, based on total core shell liquid metal encapsulate network mass, from about 88.9% to about 99.99% metal; preferably from about 95% to about 99.99% metal; more preferably from about 99% to about 99.99% metal.

Applicants disclose a core shell liquid metal encapsulate network according to any of Paragraphs 0024 through 0026 wherein said energy induced conductivity gain arises as a result of a geometric deformation of said network's core shell liquid metal encapsulate or core shell liquid metal encapsulate network, preferably said geometric deformation is induced by compression, tension, and/or shear of said network's core shell liquid metal encapsulate or core shell liquid metal encapsulate network. More preferably, said geometric deformation is induced by compression, tension, and/or shear of said network's core shell liquid metal encapsulate or core shell liquid metal encapsulate network as a result of a manual or autonomic process performed under a monotonic or cyclic loading scenario. Most preferably, said geometric deformation is a result of tension and/or shear arising as a result of manually elongating said network's core shell liquid metal encapsulate or core shell liquid metal encapsulate network to a strain between 50% and 300%. Additional preferred embodiments include: where said geometric deformation is a result of tension and/or shear arising from incrementally elongating said network's core shell liquid metal encapsulate or core shell liquid metal encapsulate network to a strain between 50% and 300%, returning to an unstrained state, before manually or autonomically elongating to a higher level of strain than that previously experienced by the system; where said geometric deformation is a result of compression and/or shear arising from compressing said network's core shell liquid metal encapsulate or core shell liquid metal encapsulate network between rigid, conductive counter-faces; where said geometric deformation is a result of elongation of a substrate material in physical and/or chemical contact with said core shell liquid metal encapsulate network or where said geometric deformation is a result of compression and/or shear force applied with a rigid and low-surface energy material.

Stretchable Conductor

Applicants disclose a stretchable conductor comprising a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof; more preferably said liquid metal is selected from the group consisting of Ga, In, Sn, Bi, Sb and mixtures thereof; most preferably said liquid metal is selected from the group consisting of Ga, In and mixtures thereof; said stretchable conductor having one or more of the following properties:
a) a conductivity increase of about 5 to about 10 orders of magnitude over an initial elongation of about 1% to about 300%; preferably a conductivity increase of about 7 to about 9 orders of magnitude over an initial elongation of about 50% to about 125%;
b) a repeatable resistance variation of less than 100% over an elongation of about 150% to about 750%; preferably a repeatable resistance variation of less than 50% over an elongation of about 150% to about 300%; more preferably a repeatable resistance variation of less than 25% over an elongation of about 150% to about 300%;
c) a repeatable resistance decrease of greater than 0% to about 20% over a range of elongation from greater than 0% to about 100%, a repeatable resistance decrease of greater than 5% to about 20% over a range of elongation from greater than 0% to about 100%, or a repeatable resistance decrease of greater than 0% to about 10% over a range of elongation from greater than 0% to about 50%.

Applicants disclose a stretchable conductor according to Paragraph 0028, wherein said stretchable conductor comprises a core shell liquid metal encapsulate network. In one aspect, said core shell liquid metal encapsulate network is a core shell liquid metal encapsulate network according to any of Paragraphs 0024 through 0027.

Process of Making Encapsulates Comprising a Liquid Metal Core and Core Shell Liquid Metal Encapsulate Networks Applicants disclose a process of producing an encapsulate comprising a liquid metal core and a metal oxide shell that encapsulates said liquid metal core, said process comprising:
a) contacting a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof; more preferably said liquid metal is selected from the group consisting of Ga, In, Sn, Bi, Sb and mixtures thereof; most preferably said liquid is metal selected from the group consisting of Ga, In and mixtures thereof; with one or more multi-functional ligands comprising a material selected from the group consisting of thiols, amines, and mixtures thereof; preferably said one or more multi-functional ligands comprise a material selected from the group consisting of thiols; more preferably said one or more multi-functional ligands comprise a material selected from the group consisting of thiols and one or more moieties selected from the group consisting of a hydrosilane, a cyclic ester, an azide, an alcohol, an alkyne, an alkene, an isocyanate, a conjugated diene, an imine, a boronate ester, a conjugated ring and mixtures thereof; preferably said one or more moieties is selected from the group consisting of an unsubstituted anthracene, a substituted anthracene, an acrylate, a methacrylate, an epoxide, a ring-strained alkene, an unsubstituted alkene, a terminal alkyne, an acrylamide, a methacrylamide, a norbornene and mixtures thereof; and/or b) contacting at least a portion of said metal oxide shell with one or more multi-functional ligands comprising a material selected from the group consisting of phosphonic acids, alkoxysilanes, halosilanes, carboxylic acids and mixtures thereof; preferably said one or more multi-functional ligands comprise a material selected from the group consisting of phosphonic acids, trialkoxysilanes, trichlorosilanes, and mixtures thereof; more preferably said one or more multi-functional ligands comprise a material selected from the group consisting of trialkoxysilanes or phosphonic acids, and one or more moieties selected from the group consisting of a hydrosilane, a cyclic ester, an azide, an alcohol, an alkyne, an alkene, an isocyanate, a conjugated diene, an imine, a boronate ester, a conjugated ring and mixtures thereof; preferably said one or more moieties is selected from the group consisting of an unsubstituted anthracene, a substituted anthracene, an acrylate, a methacrylate, an epoxide, a ring-strained alkene, an unsubstituted alkene, a terminal alkyne, an acrylamide, a methacrylamide, a norbornene and mixtures thereof; most preferably said one or more ligands are selected from the group consisting of 11-phosphonoundecyl acrylate, 3-(trimethoxysilyl)propyl acrylate, 3-(trimethoxysilyl)propyl methacrylate, (3-glycidyloxypropyl) triethoxysilane, 3-(triethoxysilyl)propyl isocyanate, 12-azidododecylphosphonic acid, trimethoxy[2-(7-oxabicyclo[4.1.0]hept-3-yl)ethyl]silane, 3-cyclopentadienylpropyltriethoxysilane, [(5-bicyclo[2.2.1]hept-2-enyl)ethyl]triethoxysilane and mixtures thereof;

c) optionally agitate and/or heat the combination formed in a) and/or b), preferably said agitation is sufficient to prevent sedimentation of said encapsulates and the temperature of said combination formed in a) and/or b) is maintained at a temperature of from about 45° C. to about 60° C. for a time of about two to about four hours;

d) optionally, removing unbound ligands by dialysis with a solvent and/or by several iterations of centrifugation and washing;

e) optionally, suspending the core shell liquid metal encapsulates in fresh solvent.

Applicants disclose a process according to Paragraph 0030 wherein one, two or three of the following steps are preformed:

a) the combination formed in a) and/or b) of Paragraph 0030 is agitated and/or heated, preferably said agitation is sufficient to prevent sedimentation of said encapsulates and the temperature of said combination formed in a) and/or b) of Paragraph 0030 is maintained at a temperature of from about 45° C. to about 60° C. for a time of about two to about four hours;

b) unbound ligands are removed by dialysis with a solvent and/or by several iterations of centrifugation and washing;

c) the core shell liquid metal encapsulates are suspended in fresh solvent

Applicants disclose a process of producing a core shell liquid metal encapsulate network from a plurality of core shell liquid metal encapsulates comprising multi-functional ligands, said process comprising stimulating said multi-functional ligands by imparting energy to said ligands and/or combining said multi-functional ligands with one or more initiators; preferably said energy is imparted by electromagnetic radiation, heat, or mechanical stimulus and preferably said one or more initiators is selected from the group consisting of photoradical initiators, thermoradical initiators, mechanoradical generators, photoacid generators, thermal acid generators, mechano-acid generators, poly-azido molecules, poly-alkyne molecules, poly-thiol molecules, poly-alkene molecules, polyols, poly-isocyanates, copper compounds, ruthenium compounds, silver compounds, and reducing organic acids and more preferably, said energy is imparted by electromagnetic radiation or heat and preferably said one or more initiators is selected from the group consisting of photoradical initiators, photoacid generators, thermal acid generators, poly-alkyne molecules, poly-alkene molecules, polyols, copper compounds, ruthenium compounds, and reducing organic acids; most preferably, said energy is imparted by electromagnetic radiation and preferably said one or more initiators is selected from the group consisting of photoradical initiators, photoacid generators, poly-alkyne molecules, polyols, copper compounds, and ascorbic acid.

Applicants disclose a process according to Paragraph 0032 wherein said core shell liquid metal encapsulates comprising multi-functional ligands are suspended in a continuous liquid phase prior to being stimulated and optionally deposited on a substrate and optionally dried on said substrate.

Methods of using Core Shell Liquid Metal Encapsulate Network

Applicants disclose a method of using a liquid metal encapsulate network, said method comprising: applying said liquid metal encapsulate network to a substrate including coating at least a portion of one or more surfaces of said substrate with said liquid metal encapsulate network, encapsulating said substrate with said liquid metal encapsulate network; connecting at least a portion of two or more substrates with said liquid metal encapsulate network and/or using said liquid metal encapsulate network as an internal component of a substrate, for example, using said liquid metal encapsulate network as the core of an encapsulate. In any of the aforementioned uses, the linkages in said network can be formed before, during or after the application of said liquid metal encapsulate network. The application of said liquid metal encapsulate network to a substrate can be achieved by methods including but not limited to: ink jet printing, aerosol jet printing, screen printing, gravure, blade coating, solution casting, spin coating, direct ink writing, extruding and combinations thereof. After being applied, said liquid metal encapsulate network may be photopatterned to selectively activate the liquid metal encapsulate network and/or change at least one portion of said liquid metal encapsulate network. When said liquid metal encapsulate network is used as provided herein, said liquid metal encapsulate network can provide a number of benefits including but not limited to, conductor healing, strain sensing, and/or consistent power delivery over large areas that are being strained.

Test Methods

Determination of Encapsulate Principal Dimension

Preparation of Sizing Encapsulates in the Size Range of 10 nanometers to 500 nanometers.

Encapsulates are sized using high-resolution scanning transmission electron microscope (STEM) images taken with a high-angle annular dark-field detector on a transmission electron microscope operating at an accelerating voltage of 200,000 electron volts. Encapsulate particles are mounted for STEM measurements by first adding 50 microliters of a given encapsulate suspension having an encapsulate concentration range between $1*10^{-5}$ and $1*10^{-4}$ millimolar to 2 milliliters of dichloromethane followed by dropping this diluted suspension onto a 400-mesh copper, carbon-film coated transmission electron microscopy grid held in self-closing, anti-capillary tweezers until a single drop falls from the grid. Following deposition, a folded piece of filter paper is used to wick excess solvent from the grid underside.

Preparation of Sizing Encapsulates in the Size Range of 501 nanometers to 5,000,000 nanometers (5 millimeters).

The encapsulates are prepared for measurement by first drop casting films on copper tape and coating the encapsulates in 10 nanometers of iridium. Encapsulates are characterized using scanning electron microscopy (SEM) at an accelerating voltage of 1000 volts and with an aperture of 20 micrometers.

ImageJ software (freely available from the National Institute of Health) is used to open images corresponding to each sample and to manually draw lines bisecting encapsulates along their longest dimension, followed by recording the length of each line drawn. This process is repeated for at least 300 encapsulates in each sample. Following measurement, the average diameter and surface-area weighted average diameter are calculated from the tabulated data.

Shell Thickness—Scanning Transmission Electron Microscopy (STEM)

STEM images of encapsulate particles are processed using the "Find Edges" routine built into the software package ImageJ which uses a Sobel image filter to highlight spatial changes in image contrast. As STEM images provide contrast based on the atomic number of the elements imaged, oxide shells typically have a difference in signal from the encapsulate core and any adventitious carbon overlayer. The "Find Edges" function reveals two lines surrounding the encapsulate; one line corresponds to the shell inner edge and one line corresponds to the shell outer edge. An intensity profile is generated within ImageJ by drawing a line which perpendicularly bisects the shell inner and outer edges followed by selection of the "Plot Profile" function. A line is then drawn on the resultant profile between the intensity maxima and a measurement taken of this distance. 50 of these measurements are taken and averaged to calculate the average encapsulate shell thickness.

Shell Thickness—X-Ray Photoelectron Spectroscopy (XPS)

XPS measurements of encapsulate oxide shell thicknesses are produced as follows. Two films for XPS are produced by spin-coating a first encapsulate sample dispersed in absolute ethanol at 2000 RPM onto substrates consisting of single-sided copper adhesive tape affixed to a 1 centimeter×1 centimeter piece of glass and a second encapsulate sample dispersed in anhydrous chlorobenzene at 2000 RPM onto substrates consisting of single-sided copper adhesive tape affixed to a 1 centimeter×1 centimeter piece of glass. The encapsulate suspension is deposited dropwise onto the spinning substrate until the layer has thickened such that the copper foil is no longer visible through the encapsulate film. Encapsulate suspensions are vortex mixed for 30 seconds immediately prior to deposition to ensure homogeneity. Optical profilometry is used to determine the root mean square (RMS) roughness for each film. The film having the lower root mean square roughness is introduced into the XPS within 30 minutes to preclude significant oxidation in air, with XPS measurements commencing within 90 minutes.

All XPS spectra are collected using a monochromated Al source. First, ideal measurement regions are identified for each core and shell forming element present. These regions are selected to achieve as low of a binding energy as possible (to permit deep photoelectron escape) while still remaining deconvolutable from other elemental regions present. If it is necessary to perform deconvolution of elemental regions which overlap with other elemental regions, an independent, non-convoluted region is be chosen for the second element and used to constrain the peak-fit of the first element during software peak-fitting. High-resolution XPS spectra are then collected from each of these regions. In addition to collection of regions corresponding to metallic core/shell constituting elements present, a survey spectrum, the O1s region, and the C1s region are also collected.

To calculate the absolute thickness of the metal oxide shell surrounding the liquid metal core of the encapsulates, the following approach is used. First, the particle sizes are determined as previously described, and are reweighted to provide a surface-area weighted average which is used in these calculations. The identity of the core material is assumed based on redox and kinetic considerations, which may be bolstered by preliminary XPS analysis to determine the principal core and shell-forming elements present. The metal oxide shell is assumed to be stoichiometric for whatever oxide-forming element is present and the organic shell overlayer is assumed to have an atomic number of Z=4. The core is assumed to be constituted of the bulk alloy used to form the encapsulate. If spin-orbit components for a given elemental transition are convoluted, both are fitted by constraining the more convoluted peak area to the less convoluted peak area using spin-orbit splitting rules. If peaks due to spin-orbit splitting are not convoluted for a given elemental transition, only the larger peak is fitted. If multiple peaks arising from the same element are present in one transition (due to chemical state differences), all peaks are constrained to have identical full-width, half-maximum values. Values for binding energy shift may be taken from the NIST XPS Database to assist in deconvolution of multiple chemical states present in a given elemental transition, if necessary. If multiple values for the binding energy shift for a given chemical state of an element are present in the NIST XPS Database, the median value is used as the value for the binding energy shift. If no value is present in the NIST XPS Database for a given chemical state in a specific, desirable elemental transition, other literature values may be sought. Finally, appropriate lineshapes and background fits should be used, based on the manufacturer's specifications for the instrument.

Following tabulation of raw peak areas, these raw data are corrected based on the relative sensitivity factors for each elemental transition collected, based on published values from the manufacturer of the x-ray photoelectron spectrometer. Next, one of these corrected signals is selected which originates only from the core, one is selected which originates only from the oxide shell, and the C1s signal is assumed to originate only from the ligands and adventitious carbon overlayer. To prepare for shell thickness calculation, the following quantities are calculated:

$$L_{1,1} = 0.316 a_1^{3/2} \left\{ \frac{E_1}{Z_1^{0.45}[\ln(E_1/27) + 3]} + 4 \right\}$$

$$B_{2,1} = (E_2/E_1)^{0.872}$$

$$B_{2,0} = (E_2/E_0)^{0.872}$$

$$C_{2,0} = (Z_2/Z_0)^{0.3}$$

$$C_{2,1} = (Z_2/Z_1)^{0.3}$$

$$L_{2,2} = L_{1,1}/(B_{2,1} C_{2,1})$$

where $L_{1,1}$ represents the photoelectron attenuation length of a photoelectron of material 1 (oxide shell material) passing through material 1, $a_1$ represents the atomic size of material 1 in nanometers which for purposes of this test methods is 0.25 nanometers in all metal oxide cases, $E_i$ represents the photoelectron energy in electron volts of the photoelectron from material i, and $Z_i$ represents the number averaged atomic number for material i, where i may be 0 for the liquid core, 1 for the oxide shell, and 2 for the carbonaceous overlayer. B and C are useful parameters for later calculations, and describe the relative opacity of each layer (core, oxide shell, carbonaceous overlayer) in the encapsulate. Next, the photoelectron attenuation length for photoelectrons originating from material 2 passing through material 2, $L_{2,2}$, is calculated. Finally, starting from the relative sensitivity factor corrected peak areas, the following quantities are calculated:

$$A_{1,0} = I_1/I_0$$

$$A_{2,1} = I_2/I_1$$

$$A_{2,0} = I_2/I_0$$

where $A_{i,j}$ represents the ratio of the photoelectron signal originating from material i to that originating from material j, and $I_i$ represents the relative sensitivity factor corrected photoelectron signal originating from material i.

To calculate the oxide shell thickness, $T_1$, and the carbonaceous overlayer thickness, $T_2$, the following iterative procedure is employed. $T_2$ is, for purposes of this test method, 0.1 nanometers. This value is converted into attenuation-length scaled units by dividing by $L_{2,2}$. Next, the value $A^*_{1,0}$ is calculated according to the equation:

$$A^*_{1,0} = A_{1,0}\{1 + n[\ln(T_2+1)]\} e^{[(B_{2,1}-B_{2,0})T_2]}$$

where $$n = \tfrac{1}{20}[(2B_{2,1}-B_{2,0})(4.5+C_{2,1}) + 2(B_{2,0}-1)C_{2,1} + 4.6]$$

followed by conversion of particle radius, R, from units of absolute length (nanometers or similar) to photoelectron attenuation length scale by division by $L_{1,1}$. Finally, a value for the oxide shell thickness, $T_1$, is calculated via the following set of equations:

$$T_{R \to \infty} = \frac{0.74 A^{3.6} \ln(A) B^{-0.9} + 4.2 A B^{-0.41}}{A^{3.6} + 8.9}$$

$$T_0 = R_{NP}\left[(ABC+1)^{\frac{1}{3}} - 1\right]$$

$$\alpha = \frac{1.8}{A^{0.1} B^{0.5} C^{0.4}}$$

$$\beta = \frac{0.13 \alpha^{2.5}}{R_{NP}^{1.5}}$$

$$T_{R-1} = \frac{T_{R \to \infty} R}{R_{NP} + \alpha}$$

$$T_1 = \frac{T_{R \to \infty} + \beta T_0}{1 + \beta}$$

where $$B = \frac{B_{2,0}}{B_{2,1}}$$

$$C = \frac{C_{2,0}}{C_{2,1}}$$

$$A = A^*_{1,0}$$

$$R_{NP} = R + T_1$$

The value for $T_1$ calculated in this manner is then converted from units of $L_{1,1}$ to units of $L_{2,2}$ by multiplying by $L_{2,2}/L_{1,1}$. Next, the following quantities are calculated:

$$A_{\text{eff}} = \frac{A_{2,1} A_{2,0}}{A_{2,1} + A_{2,0}}$$

$$B_{\text{eff}} = w B_{2,1} + (1-w) B_{2,0}$$

$$C_{\text{eff}} = w C_{2,1} + (1-w) C_{2,0}$$

where $$w = \frac{A_{1,0}}{A_{1,0} + 0.8 + 0.5 B_{1,0}^4}$$

Next, the value for particle radius, R, is converted into units of $L_{2,2}$ by dividing R by $L_{2,2}$. Finally, a new value for $T_2$ is calculated via the following equations:

$$T_{R \to \infty} = \frac{0.74 A^{3.6} \ln(A) B^{-0.9} + 4.2 A B^{-0.41}}{A^{3.6} + 8.9}$$

$$T_0 = R_{NP}\left[(ABC+1)^{\frac{1}{3}} - 1\right]$$

$$\alpha = \frac{1.8}{A^{0.1} B^{0.5} C^{0.4}}$$

$$\beta = \frac{0.13 \alpha^{2.5}}{R_{NP}^{1.5}}$$

$$T_{R-1} = \frac{T_{R \to \infty} R}{R_{NP} + \alpha}$$

$$T_2 = \frac{T_{R \to \infty} + \beta T_0}{1 + \beta}$$

where $$A = A_{\text{eff}}$$

$$B = B_{\text{eff}}$$

$$C = C_{\text{eff}}$$

$$R_{NP} = R + T_1$$

and $R_{NP}$, R, and $T_1$ are expressed in units of $L_{2,2}$.

To converge on consistent values for $T_1$, the oxide shell thickness, and $T_2$, the carbonaceous shell thickness, the above procedure for calculating $T_1$ and $T_2$ is iterated on until the values for $T_1$ and $T_2$ converge across two cycles wherein the deviation between the two cycles is less than 0.01%. These values are then taken as the actual absolute thicknesses of the oxide shell and carbonaceous overlayer.

Conductivity under Elongation

Stretchable conductor traces are prepared on taped sections of flat 2-hydroxyethyl acrylate substrates to produce a rectangular geometry (10 millimeters length by 4 millimeters wide with a thickness between 0.01 and 0.15 millimeters). Trace dimensions are measured using an optical profilometer and the thickness is calculated by comparing the average height of the trace to the average height of the underlying substrate. The direct-current electrical resistance is taken as an average of ten measurements using a four-point probe method taken from the center of the sample with a probe spacing of 1 millimeter. The conductivity is calculated using initial geometries and a correction factor for a thin rectangular section shown below:

$$\sigma = \frac{\ln 2}{\pi} \cdot \frac{1}{t} \cdot \frac{1}{0.7115} \cdot R$$

where σ is the conductivity, t is the thickness of the sample, and R is the measured resistance.

Single-sided copper adhesive tape is adhered directly onto the traces at each end, overlapping the encapsulate network by 2 millimeters to ensure good contact across the trace width. A single droplet of liquid metal (50 microliters) is spotted on the interfaces between the copper tape and stretchable conductor trace to further enhance electrical contact and retain said contact throughout the test, especially at high strains.

Electromechanical testing is performed using a lead-screw driven biaxial stretching platform. Experiments are performed in uniaxial mode with an integrated, inline 10 newton tensile load cell (resolution=±0.05 newtons). Horizontally opposed, self-tightening grips comprising a metallic body, with a uniform clamping force from an internally mounted torsional spring, are used to mount the samples. Test samples are clamped at the inner edges of the copper tape. Electrical leads are connected to the metallic grips using alligator-style clips. Prior to the application of tensile strain, test samples are preloaded to 0.1 newtons to remove any slack in the sample length. Experiments are performed at a linear applied strain rate of 300 millimeters per minute.

In situ direct-current two-wire electrical resistance measurements are recorded using a digital multimeter and data acquisition system. The baseline resistance of the system with no sample present is subtracted from the measured resistances during testing. As the measured length (L) of a sample increases, a reciprocal decrease in cross-sectional area (A) of the trace is assumed such that the product L*A is constant. The relative conductivity (C) is calculated from the measured resistance (R) at a given strain using the equation:

$$C = \frac{L}{R \cdot A}$$

A correction factor is determined such that the zero strain state conductivity is equivalent to the conductivity measured from the previous 4-point probe measurement. The conductivity at a given strain is calculated by multiplying the relative conductivity (C) against this correction factor.

Repeatable Resistance Variation and Decrease

The repeatability of both resistance variation and decrease are determined through monotonic and cyclic electromechanical experiments. Test samples consisting of single traces (15 millimeters×4 millimeters×0.1 millimeters) of stretchable conductor networks drop cast across the gauge length (20 millimeters×4 millimeters) of 2-hydroxyethyl acrylate 'dog-bone' tensile specimens are used. Single-sided copper adhesive tape (3M, ¼ inch width) is adhered directly onto the trace at each end, overlapping the encapsulate network a few millimeters to ensure good contact across the trace width. A single droplet of liquid metal (50 microliters) is spotted on the interfaces between the copper tape and stretchable conductor trace to further enhance electrical contact and retain said contact throughout the test, especially at high strains.

Electromechanical testing is performed using a lead-screw driven biaxial stretching platform. Experiments are performed in uniaxial mode with an integrated, inline 10 newton tensile load cell (resolution=±0.05 newtons). Horizontally opposed, self-tightening grips comprising a metallic body, with a uniform clamping force from an internally mounted torsional spring, are used to mount the samples. Test samples are clamped at the edges of the copper tape. Electrical leads are connected to the metallic grips using alligator-style clips. Prior to the application of tensile strain, test samples are preloaded to 0.1 newtons to remove any slack in the sample length. Experiments are performed at a linear applied strain rate of 300 millimeters per minute.

In situ direct-current two-wire electrical resistance measurements are recorded using a digital multimeter and data acquisition system. The baseline resistance of the system with no sample present is subtracted from the measured resistances during testing. Cyclic tests to determine repeatability are performed to 1000 strain cycles.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1 Production of 11-Phosphonoundecyl Acrylate Functionalized EGaIn Liquid Metal Encapsulates Gallium and Indium were combined to produce a eutectic liquid alloy of GaIn (14.2 atom % In, 85.8 atom % Ga). A total of 9 milligrams of the ligand 11-phosphonoundecyl acrylate was dissolved in 10 milliliters of ethanol (200 proof, anhydrous USP) and added to a 20 milliliters glass vial containing 200 milligrams of the GaIn alloy. The mixture was sonicated in an ultrasonic bath at 45° C. for two hours to produce GaIn particles having a number average diameter of about 3 microns. The resulting colloidal solution was centrifuged at 2600 RCF for 3 minutes and the supernatant was removed and replaced. This process was repeated three times, after which the particles were suspended in 4 milliliters of ethanol.

Example 2 Production of 12-Azidododecylphosphonic acid Functionalized EGaIn Liquid Metal Encapsulates To produce nanoscale EGaIn-based liquid metal encapsulates functionalized with 12-azidododecylphosphonic acid, a multi-functional ligand molecule, 0.1 milliliters of EGaIn (14.2 atom % In, 85.8 atom % Ga) was placed into a 20 milliliters, 28 millimeters outer diameter borosilicate glass scintillation vial containing 14.9 milliliters absolute ethanol. A 3 millimeters ultrasonic probe microtip driven by a Sonics and Materials, Inc. VCX500 ultrasonic processor was then immersed approximately half of the vial height into the ethanol. Parafilm was then used to seal the vial opening as completely as possible to minimize solvent loss during ultrasonication. Sonication was then carried out for two hours at an amplitude of 17% while the vial temperature was held constant at a temperature of 10° C. using a water bath to produce nanoscale EGaIn particles having a number average diameter of about 160 nanometers.

Following ultrasonication, the vial of EGaIn encapsulate suspension was removed from the ultrasonication apparatus and 17 milligrams of 12-azidododecylphosphonic acid was added to the vial. The vial was then sealed with its cap and placed into a bath sonicator held at a temperature of 45° C. and sonicated for 30 minutes to bond phosphonic acid ligands to the EGaIn particle surface. Following the ligand attachment step, excess ligands were removed from solution by a series of centrifugation and washing steps where the particle suspension was placed into a centrifugation tube and spun at 8229 RCF for 20 minutes, after which the supernatant is decanted and the encapsulate sediment is redispersed into a 3:1 (v:v) mixture of chlorobenzene:methanol. This process is repeated three times before a final redispersion of the encapsulate particles into 3:1 chlorobenzene:methanol.

Example 3 Production of (3-glycidyloxypropyl) triethoxysilane Functionalized EGaIn Liquid Metal Encapsulates (3-glycidyloxypropyl) triethoxysilane functionalized EGaIn liquid metal encapsulates were produced in the same way as 12-azidododecylphosphonic acid functionalized encapsulates, except, 1 milliliter of (3-glycidyloxypropyl) triethoxysilane was used per 10 milliliters of solvent and the particle suspension was stirred at ambient temperature for 16 hours after addition, rather than 30 minutes of bath sonication. Excess ligand was removed from solution by three centrifugation/wash steps at 8229 RCF for 20 minutes with chlorobenzene. The final particles produced in this manner were redispersed into chlorobenzene for later use.

Example 4 Production of 11-Mercaptoundecanoic acid Functionalized EGaIn Liquid Metal Encapsulates 11-mercaptoundecanoic acid functionalized particles were made by placing 0.1 milliliters of EGaIn liquid metal into a 20 milliliters, 28 millimeters outer diameter borosilicate scintillation vial. To this vial was added 14.9 milliliters of a 64 millimolar solution of 11-mercaptoundecanoic acid in absolute ethanol. A 3 millimeter ultrasonic probe microtip driven by a Sonics and Materials, Inc. VCX500 ultrasonic processor was then immersed approximately half of the vial height into the ethanol. Parafilm was then used to seal the vial opening as completely as possible to minimize solvent loss during ultrasonication. Sonication was then carried out for sixteen hours at an amplitude of 30% while the vial temperature was held constant at a temperature of 10° C. using a water bath to produce nanoscale EGaIn particles having a number average diameter of about 60 nanometers. Excess ligand was removed from solution by a series of centrifugation/redispersion steps in which the particle suspension was centrifuged at 8229 RCF for 30 minutes to sediment the particles, followed by redispersion in fresh absolute ethanol. These steps were repeated three times before a final redispersion into absolute ethanol. Particles produced in this manner had a number averaged diameter of about 60 nanometers and a gallium oxide shell thickness of about 1.2-1.3 nanometers.

Example 5 Production of 4-Aminophenyl propargyl ether Functionalized EGaIn-based Liquid Metal Encapsulates 4-Aminophenyl propargyl ether functionalized EGaIn particles are made as in Example 4 for EGaIn particles functionalized with 11-mercaptoundecanoic acid, except, 4-aminophenyl propargyl ether is substituted for 11-mercaptoundecanoic acid wherever 11-mercaptoundecanoic acid is used in the procedure.

Example 6 Production of 12-Azidododecylphosphonic acid Functionalized Ga—In—Sn Alloy Liquid Metal Encapsulates Ga—In—Sn alloy (68.5 wt % Ga, 21.5 wt % In, 10 wt % Sn) liquid metal particles functionalized with 12-azidododecylphosphonic acid are made as in Example 2 for EGaIn particles functionalized with 12-azidododecylphosphonic acid, except, Ga—In—Sn alloy (68.5 wt % Ga, 21.5 wt % In, 10 wt % Sn) liquid metal is substituted for EGaIn wherever EGaIn is used.

Example 7 Production of (3-glycidyloxypropyl) triethoxysilane Functionalized Ga—In—Sn Alloy Liquid Metal Encapsulates Ga—In—Sn alloy (68.5 wt % Ga, 21.5 wt % In, 10 wt % Sn) liquid metal particles functionalized with (3-glycidyloxypropyl) triethoxysilane are made as in Example 3 for EGaIn particles functionalized with (3-glycidyloxypropyl) triethoxysilane, except, Ga—In—Sn alloy (68.5 wt % Ga, 21.5 wt % In, 10 wt % Sn) liquid metal is substituted for EGaIn wherever EGaIn is used.

Example 8 Production of 11-Mercaptoundecanoic acid Functionalized Ga—In—Sn Alloy Liquid Metal Encapsulates Ga—In—Sn alloy (68.5 wt % Ga, 21.5 wt % In, 10 wt % Sn) liquid metal particles functionalized with 11-mercaptoundecanoic acid were made as in Example 4 for EGaIn particles functionalized with 11-mercaptoundecanoic acid, except, Ga—In—Sn alloy (68.5 wt % Ga, 21.5 wt % In, 10 wt % Sn) liquid metal is substituted for EGaIn wherever EGaIn is used.

Example 9 Production of 4-Aminophenyl propargyl ether Functionalized Ga—In—Sn Alloy Liquid Metal Encapsulates Ga—In—Sn alloy (68.5 wt % Ga, 21.5 wt % In, 10 wt % Sn) liquid metal particles functionalized with 4-aminophenyl propargyl ether are made as in Example 5 for EGaIn particles functionalized with 4-aminophenyl propargyl ether, except, Ga—In—Sn alloy (68.5 wt % Ga, 21.5 wt % In, 10 wt % Sn) liquid metal is substituted for EGaIn wherever EGaIn is used.

Example 10 Production of 12-Azidododecylphosphonic acid Functionalized Field's metal Liquid Metal Encapsulates Field's metal (32.5 wt % Bi, 51 wt % In, 16.5 wt % Sn) liquid metal particles functionalized with 12-azidododecylphosphonic acid are made as in Example 2 for EGaIn particles functionalized with 12-azidododecylphosphonic acid, except, Field's liquid metal alloy is substituted for EGaIn wherever EGaIn is used, the bath temperature for ultrasonication is held at 65° C., and ethylene glycol is used as solvent in place of ethanol.

Example 11 Production of (3-glycidyloxypropyl) triethoxysilane Functionalized Field's metal Liquid Metal Encapsulates Field's metal (32.5 wt % Bi, 51 wt % In, 16.5 wt % Sn) liquid metal particles functionalized with (3-glycidyloxypropyl) triethoxysilane are made as in Example 3 for EGaIn particles functionalized with (3-glycidyloxypropyl) triethoxysilane, except, Field's liquid metal alloy is substituted for EGaIn wherever EGaIn is used, the bath temperature for ultrasonication is held at 65° C., and ethylene glycol is used as solvent in place of ethanol.

Example 12 Production of 11-Mercaptoundecanoic acid Functionalized Field's metal Liquid Metal Encapsulates Field's metal (32.5 wt % Bi, 51 wt % In, 16.5 wt % Sn) liquid metal particles functionalized with 11-mercaptoundecanoic acid are made as in Example 4 for EGaIn particles functionalized with 11-mercaptoundecanoic acid, except, Field's liquid metal alloy is substituted for EGaIn wherever EGaIn is used, the bath temperature for ultrasonication is held at 65° C., and ethylene glycol is used as solvent in place of ethanol.

Example 13 Production of 4-Aminophenyl propargyl ether Functionalized Field's metal Liquid Metal Encapsulates Field's metal (32.5 wt % Bi, 51 wt % In, 16.5 wt % Sn) liquid metal particles functionalized with 4-aminophenyl propargyl ether are made as in Example 5 for EGaIn particles functionalized with 4-aminophenyl propargyl ether, except, Field's liquid metal alloy is substituted for EGaIn wherever EGaIn is used, the bath temperature for ultrasonication is held at 65° C., and ethylene glycol is used as solvent in place of ethanol.

Example 14 Production of Covalently-linked Triazole-containing Networks from 12-Azidododecylphosphonic acid Functionalized EGaIn Liquid Metal Encapsulates 12-Azidododecylphosphonic acid functionalized EGaIn liquid metal encapsulates are produced as described in Example 2. To this particle suspension is added 6.18 microliters of propargyl ether, followed by the addition of 2.4 milligrams sodium ascorbate and 1 milligram of copper(II) sulfate pentahydrate. This mixture is then pipetted onto a stretchable substrate and allowed to dry before activation of the electrical conductivity of the network via stretching.

Example 15 Production of 3-(Trimethoxysilyl)propyl Methacrylate Functionalized EGaIn Liquid Metal Encapsulates 3-(trimethoxysilyl)propyl methacrylate functionalized EGaIn liquid metal encapsulates were produced in the same way as Example 1, except, 1 milliliter of 3-(trimethoxysilyl) propyl methacrylate was used in place of 9 milligrams of 11-phosphonoundecyl acrylate.

Example 16 Production of Cross-linked Particle Networks in Ethanol based on 11-Phosphonoundecyl Acrylate Functionalized EGaIn Liquid Metal Encapsulates 3 milligrams of photoinitiator phenylbis(2,4,6-trimethylbenzoyl) phosphine oxide was added to a 4 milliliter solution of ethanol and 200 milligrams of eutectic GaIn particles functionalized with 11-phosphonoundecyl acrylate according to Example 1. The mixture was exposed to 94.125 milliwatts per square centimeter of 365 nanometer wavelength light for 180 seconds to cross-link particles together and form a network.

Example 17 Production of Cross-linked Particle Networks in DMSO based on 11-Phosphonoundecyl Acrylate Functionalized EGaIn Liquid Metal Encapsulates 4 milligrams of photoinitiator phenylbis(2,4,6-trimethylbenzoyl) phosphine oxide was added to a 2 milliliter solution of DMSO and 200 milligrams of eutectic GaIn particles functionalized with 11-phosphonoundecyl acrylate according to Example 1. The mixture was exposed to 94.125 milliwatts per square centimeter of 365 nanometer wavelength light for 180 seconds to cross-link particles together and form a network.

Example 18 Production of Substrate Bound Cross-linked Particle Networks based on 11-Phosphonoundecyl Acrylate Functionalized EGaIn Liquid Metal Encapsulates 3 milligrams of photoinitiator phenylbis(2,4,6-trimethylbenzoyl) phosphine oxide was added to a 4 milliliter solution of ethanol and 200 milligram of eutectic GaIn particles functionalized with 11-phosphonoundecyl acrylate according to Example 1. This solution was drop cast onto an elastomer substrate comprising 2-hydroxyethyl acrylate. When the agglomerate appeared visually dry, 365 nanometer wavelength light was irradiated from underneath the substrate for 180 seconds at an intensity of 94.125 milliwatts per square centimeter to cross-link the particles into a network which also has linkages to the elastomer substrate.

Example 19 Production of Substrate Bound Cross-linked Particle Networks based on 3-(Trimethoxysilyl)propyl Methacrylate Functionalized EGaIn Liquid Metal Encapsulates 4 milligrams of photoinitiator phenylbis(2,4,6-trimethylbenzoyl)phosphine oxide was added to a 2 milliliters solution of ethanol and 200 milligrams of eutectic GaIn particles functionalized with 3-(trimethoxysilyl)propyl methacrylate according to Example 15. This solution was drop cast onto an elastomer substrate comprising 2-hydroxyethyl acrylate. When the agglomerate appeared visually dry, 365 nanometer wavelength light was irradiated from underneath the substrate for 180 seconds at an intensity of 94.125 milliwatts per square centimeter to cross-link the particles into a network which also has linkages to the elastomer substrate.

Example 20 Production of Cross-linked Particle Networks in Tetrahydrofuran based on (3-Glycidyloxypropyl) Triethoxysilane Functionalized EGaIn Liquid Metal Encapsulates 2 milligrams of a 50 wt % solution of photoinitiator triarylsulfonium hexafluoroantimonate in propylene carbonate is added to a 4 milliliter solution of tetrahydrofuran and 200 milligrams of eutectic GaIn particles functionalized with (3-glycidyloxypropyl) triethoxysilane prepared according to Example 3. This solution is exposed to 94.125 milliwatts per square centimeter of 365 nanometer wavelength light for 180 seconds to cross-link particles together.

Example 21 Production of Activated Particle Networks based on 11-Phosphonoundecyl Acrylate Functionalized EGaIn Liquid Metal Encapsulates in Ethanol Cross-linked particle networks prepared according to Example 16 were drop cast onto an elastomer substrate comprising 2-hydroxyethyl acrylate and the solvent was allowed to dry. When the substrate was stretched, a conductivity increase of about 7 to about 9 orders of magnitude was observed in the particle network over a uniaxial elongation of about 50% to 125%. After 10 iterations of uniaxial stretching to 300% elongation and back these particle networks were observed to have a conductivity of about 800 Siemens per centimeter. After 10 iterations of uniaxial stretching to 300% elongation and back, a repeatable resistance variation of less than 100% was observed while elongating to about 750% elongation.

Example 22 Production of Activated Particle Networks based on 11-Phosphonoundecyl Acrylate Functionalized EGaIn Liquid Metal Encapsulates in DMSO Cross-linked particle networks prepared according to Example 17 were drop cast onto an elastomer substrate comprising 2-hydroxyethyl acrylate and the system was heated until dry. When the substrate was stretched, a conductivity increase of about 7 to about 9 orders of magnitude was observed in the particle network over a uniaxial elongation of about 50% to 125%. After 10 iterations of uniaxial stretching to 200% elongation and back these particle networks were observed to have a conductivity of about 2500 Siemens per centimeter. After 10 iterations of uniaxial stretching to 200% elongation and back, a repeatable resistance decrease of greater than 0% to about 20% over a range of elongation from greater than 0% to about 100% was observed.

Example 23 Use of Cross-linked Liquid Metal Particle Networks as a Passive Strain Monitor with Active Sensing Cross-linked particle networks prepared according to Example 17 are drop cast onto an elastomer substrate comprising 2-hydroxyethyl acrylate and the system is heated until dry. The system is optionally encapsulated and then the 2-hydroxyethyl acrylate substrate is adhered to an element of interest capable of undergoing strain and being of higher modulus than the substrate. The cross-linked particle network is electrically connected in line with a circuit that is also connected to a power source and an element capable of indicating, such as a light or communication module. When the element of interest undergoes sufficient strain the cross-linked particle network will greatly increase in conductivity and complete the circuit.

Example 24 Use of Cross-linked Liquid Metal Particle Networks as a Passive Strain Monitor Cross-linked particle networks prepared according to Example 17 are drop cast onto an elastomer substrate comprising 2-hydroxyethyl acrylate in a radio-frequency identification (RFID) antenna pattern and the system is heated until dry. The system is optionally encapsulated and then the 2-hydroxyethyl acrylate substrate is adhered to an element of interest capable of undergoing strain and being of higher modulus than the substrate. When the element of interest undergoes sufficient strain the cross-linked particle network will greatly increase in conductivity and be readable by an RFID reader.

Example 25 Use of Cross-linkable Liquid Metal Encapsulates for Ink-Jet and/or Aerosol Jet Printing and Subsequent Network Formation Liquid metal encapsulates are prepared according to Example 7 and diluted with n-methyl-2-pyrrolidone such that the encapsulates are suspended in a solution of 75% by volume ethanol and 25% by volume n-methyl-2-pyrrolidone. To this solution is added 4% by weight of a solution of triarylsulfoniumhexafluoroantimonate in propylene carbonate (50/50 by weight). This solution is then ink-jet printed or aerosol jet printed with a thickness between 1-100 microns and exposed to 94.125 milliwatts per square centimeter of 365 nanometer wavelength light for 180 seconds to cross-link particles together.

Example 26 Production of Patterned and Substrate Bound Cross-linked Liquid Metal Particle Networks based on 11-Phosphonoundecyl Acrylate Functionalized EGaIn Liquid Metal Encapsulates 3 milligrams of photoinitiator phenylbis(2,4,6-trimethylbenzoyl)phosphine oxide was added to a 4 milliliter solution of ethanol and 200 milligrams of eutectic GaIn particles functionalized with 11-phosphonoundecyl acrylate according to Example 1. This solution was drop cast onto an elastomer substrate comprising 2-hydroxyethyl acrylate. When the agglomerate appeared visually dry, 365 nanometer wavelength light was irradiated in a pattern from underneath the substrate for 180 seconds at an intensity of 94.125 milliwatts per square centimeter to selectively cross-link the particles into a network which also has linkages to the elastomer substrate.

Example 27 Use of Activated Particle Networks as a Stretchable Inductor that can be physically tuned Activated particle networks prepared according to Example 22 are fashioned into a coil. A changing magnetic field is applied to the activated particle networks in either a stretched or non-stretched state to induce a current via inductance. As the particle network is elongated and physically modified the inductance and/or inductive coupling to a nearby circuit is also modulated.

Example 28 Use of Activated Particle Networks as a Stretchable Capacitor that can be physically tuned Activated particle networks prepared according to Example 22 are fashioned into parallel elements such that the separation between the elements relative to the surface area of the elements closest shared face is small. A DC voltage is applied to the activated particle networks in either a stretched or non-stretched state to induce capacitance. As the particle network is elongated and physically modified the inductance and/or inductive coupling to a nearby circuit is also modulated.

Example 29 Use of Activated Particle Networks as a Low Variation Stretchable Electrical Interconnect Activated particle networks prepared according to Example 22 are combined in line with an electrical device such that the activated particle network may stretch during operation while allowing uninhibited continuous function of the electrical device between strains of 1-100%.

Example 30 Use of Activated Particle Networks as a Stretchable Conductor for Consistent Power Delivery Activated particle networks prepared according to Example 22 are connected with both a power source and an electrical device such that the activated particle network may stretch during operation. Transmission of DC current from the power source to the electrical device is stable as the activated particle network is stretched between 1-100% elongation.

Example 31 Use of Cross-linked Particle Networks as a Push-to-Connect Stretchable Interconnect Cross-linked particle networks prepared according to Example 17 are drop cast between two or more electrical elements such that the cross-linked particle networks make physical contact with the electrical elements and span the distance between them. Compressive force is applied through a low-surface energy material onto the cross-linked particle networks such that the particles of the network rupture to form an electrically conductive wire spanning the electrical elements.

Example 32 Use of Cross-linked Particle Networks as a Damage Healing Element for Conductors Cross-linked particle networks prepared according to Example 17 are drop cast onto a conductive element. A damaging force which compromises the electrical integrity of the underlying conductive element is applied such that the cross-linked particle networks rupture. After removal of the damaging force the ruptured particles connect undamaged areas of the conductive element to restore conductivity across the conductive element.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An encapsulate comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface:
  a) said liquid metal core comprising a liquid metal selected from the group consisting of Hg, Pb, Sn, Sb, Cd, Bi, Ga, In, Al, Zn, Ag, Au, Tl and mixtures thereof;
  b) said shell comprising a metal oxide comprising a cation derived from a metal selected from the group consisting of Ga, In, Sn, Pb, Sb, Cd, Al, Zn, Tl, Bi, Ca, Sc, Ti, V, Cr, Sr, Y, Zr, Nb, Mo, Te, Gd, Hf, Pr, Nd, Pt, Sm, Eu, Dy, Ho, Er, Yb, Pu and mixtures thereof; and
  c) said one or more multi-functional ligands comprising a head group that comprises a material selected from the group consisting of thiols, amines, phosphonic acids, alkoxysilanes, halosilanes, nitriles, and mixtures thereof.

2. An encapsulate according to claim 1, comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface:
  a) said liquid metal core comprising a liquid metal selected from the group consisting of Ga, In, Sn, Bi, Pb, Cd, Sb and mixtures thereof;
  b) said shell comprising a metal oxide comprising a cation derived from a metal selected from the group consisting of Ga, Al, Zn, Sc, Ti, Cr, Zr, Nb, Gd, Nd, Sm and mixtures thereof; and
  c) said one or more multi-functional ligands comprising a head group that comprises a material selected from the group consisting of thiols, phosphonic acids, trialkoxysilanes, trichlorosilanes, and mixtures thereof.

3. An encapsulate according to claim 2, comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface:
  a) said liquid metal core comprising a liquid metal selected from the group consisting of Ga, In, Sn, Bi, Sb and mixtures thereof;
  b) said shell comprising a metal oxide comprising a cation derived from a metal selected from the group consisting of Ga, Al, Zn, Gd, Nd and mixtures thereof; and
  c) said one or more multi-functional ligands comprising a head group that comprises a material selected from the group consisting of thiols, trialkoxysilanes or phosphonic acids, and one or more additional moieties selected from the group consisting of a hydrosilane, a cyclic ester, an azide, an alcohol, an alkyne, an alkene, an isocyanate, a conjugated diene, an imine, a boronate ester, a conjugated ring, an amine, a thiol, a phosphonic acid, an alkoxysilane, a halosilane, a nitrile and mixtures thereof.

4. An encapsulate according to claim 3, comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface:
  a) said liquid metal core comprising a liquid metal selected from the group consisting of Ga, In and mixtures thereof; and
  b) said one or more multi-functional ligands comprising a head group that comprises a material selected from the group consisting of 11-phosphonoundecyl acrylate, 3-(trimethoxysilyl)propyl acrylate, 3-(trimethoxysilyl) propyl methacrylate, (3-glycidyloxypropyl) triethoxysilane, 3-(triethoxysilyl)propyl isocyanate, 12-azidododecylphosphonic acid, trimethoxy[2-(7-oxabicyclo[4.1.0]hept-3-yl)ethyl]silane, 3-cyclopentadienylpropyltriethoxysilane, [(5-bicyclo[2.2.1]hept-2-enyl)ethyl]triethoxysilane, 11-phosphonoundecanoic acid, and mixtures thereof.

5. An encapsulate according to claim 1 wherein:
  a) said liquid metal core comprising a liquid metal alloy selected from the group consisting of Ga/In, Ga/In/Sn, Ga/In/Sn/Sb, In/Sn/Bi, Bi/Pb/Sn, Bi/Pb/Sn/Cd, Bi/Pb/Sn/Cd/In and mixtures thereof;
  b) said shell comprising a metal oxide comprising a cation derived from a metal selected from the group consisting of Ga, Sn, Sb, Cd, Bi, In and mixtures thereof; and
  c) said one or more multi-functional ligands comprise a head group that comprises a material selected from the group consisting of phosphonic acids, trialkoxysilanes and mixtures thereof.

6. An encapsulate according to claim 5 wherein
  a) said liquid metal core comprising a liquid metal alloy selected from the group consisting of Ga/In, Ga/In/Sn, Ga/In/Sn/Sb, In/Sn/Bi and mixtures thereof,
  b) said shell comprising a metal oxide comprising a cation derived from a metal selected from the group consisting of Ga, In, Bi and mixtures thereof, and
  c) said one or more multi-functional ligands comprise a head group that comprises a material selected from the group consisting of phosphonic acids or trialkoxysilanes possessing an acrylate or methacrylate moiety and mixtures thereof.

7. An encapsulate according to claim 6 wherein:
  a) said liquid metal core comprising a liquid metal alloy selected from the group consisting of said liquid is metal selected from the group consisting of 85.8 atom % Ga/14.2 atom % In, 78.3 atom % Ga/14.9 atom % In/6.8 atom % Sn and mixtures thereof; and
  c) said one or more multi-functional ligands comprise a head group that comprises a material selected from the group consisting of 11-phosphonoundecyl acrylate, 3-(trimethoxysilyl)propyl methacrylate and mixtures thereof.

8. An encapsulate according to claim 1, said encapsulate having a shell thickness of from about 0.5 nanometers to about 5 nanometers.

9. An encapsulate according to claim 1, said encapsulate having a principal dimension of from about 5 nanometers to about 5 millimeters.

10. A core shell liquid metal encapsulate network comprising a plurality of encapsulates selected from the group consisting of encapsulates according to claim 1, and mixtures there of wherein said encapsulates' are covalently or coordinatively bound via a linkage comprising a residue of said ligands of said encapsulates to the external shell of an encapsulate other than the external shell of the encapsulate to which said ligands were originally covalently or coordinatively bound.

11. The core shell liquid metal encapsulate network of claim 10 wherein said linkage has the formula:

a) each * represents the chemical attachment point to a core shell liquid metal encapsulate;

b) each X represents a molecular segment selected from the group of chemical structures comprising C—S, C—N, C—P—O, C—Si—O, O—Si—O; and
c) R represents a molecular segment independently selected from the group of chemical structures comprising C—C, C=C, C—S—C, N—N—N, C—N, O—C—N, C—O—C, Si—O—Si.

12. The core shell liquid metal encapsulate network of claim 11 wherein said linkage has the formula:

*—X—R—X—* a) each * represents the chemical attachment point to a core shell liquid metal encapsulate;
b) each X represents a molecular segment selected from the group of chemical structures comprising thiols, amines, phosphonates, silyl ethers, esters and mixtures thereof; and
c) R represents a molecular segment independently selected from the group of chemical structures comprising thioethers, triazoles, dimerized ring systems, urethanes, ethers, esters, amides, tetrahydropyridines, alkanes, aromatics, siloxanes and mixtures thereof.

13. The core shell liquid metal encapsulate network of claim 12 wherein said linkage has the formula:

*—X—R—X—* a) each * represents the chemical attachment point to a core shell liquid metal encapsulate;
b) each X represents a molecular segment selected from the group of chemical structures comprising phosphonates and silyl ethers and mixtures thereof, and
c) R represents a molecular segment independently selected from the group of chemical structures comprising thioethers, triazoles, urethanes, ethers, amides, carboxylic acid esters, siloxanes and mixtures thereof.

14. The core shell liquid metal encapsulate network of claim 13 wherein R represents a molecular segment independently selected from the group of chemical structures comprising polyethers, polyacrylates, polyacrylamides, polyurethanes, polysiloxanes, thioethers, triazoles, and mixtures thereof.

15. The core shell liquid metal encapsulate network of claim 10, said core shell liquid metal encapsulate network comprising, based on total core shell liquid metal encapsulate network mass, from about 88.9% to about 99.99% metal.

16. The core shell liquid metal encapsulate network according to claim 10, wherein said energy induced conductivity gain arises as a result of a geometric deformation of said network's core shell liquid metal encapsulate or core shell liquid metal encapsulate network.

17. A process of producing an encapsulate comprising a liquid metal core and a metal oxide shell that encapsulates said liquid metal core, said process comprising:
a) contacting a liquid metal selected from the group consisting of Hg, Pb, Sn, Sb, Cd, Bi, Ga, In, Al, Zn, Ag, Au, Tl and mixtures thereof; with one or more multi-functional ligands comprising a material selected from the group consisting of thiols, amines, and mixtures thereof, and/or
b) contacting at least a portion of said metal oxide shell with one or more multi-functional ligands comprising a material selected from the group consisting of phosphonic acids, alkoxysilanes, halosilanes and mixtures thereof,
c) optionally agitate and/or heat the combination formed in a) and/or b);
d) optionally, removing unbound ligands by dialysis with a solvent and/or by several iterations of centrifugation and washing;
e) optionally, suspending the core shell liquid metal encapsulates in fresh solvent.

18. A process according to claim 17 wherein one, two or three of the following steps are preformed:
a) the combination formed in a) and/or b) of claim 17 is agitated and/or heated;
b) unbound ligands are removed by dialysis with a solvent and/or by several iterations of centrifugation and washing;
c) the core shell liquid metal encapsulates are suspended in fresh solvent.

* * * * *